(12) United States Patent
Honegger

(10) Patent No.: US 6,306,072 B1
(45) Date of Patent: *Oct. 23, 2001

(54) METHOD AND SYSTEM FOR PRODUCTION AND DECENTRALIZED DELIVERY OF PRINTED PRODUCTS

(75) Inventor: Werner Honegger, Bäch (CH)

(73) Assignee: Ferag AG, Hinwil (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,685
(22) PCT Filed: Jan. 23, 1996
(86) PCT No.: PCT/CH96/00032
§ 371 Date: Sep. 11, 1997
§ 102(e) Date: Sep. 11, 1997
(87) PCT Pub. No.: WO96/24104
PCT Pub. Date: Aug. 8, 1996

(30) Foreign Application Priority Data

Feb. 1, 1995 (CH) .................................................. 00269/95
Jul. 28, 1995 (CH) .................................................. 02211/95

(51) Int. Cl.[7] ................................ B31B 49/00; G06F 7/66
(52) U.S. Cl. ................................ 493/364; 493/2; 493/23; 493/29; 283/34; 700/127; 700/128
(58) Field of Search .................................. 493/364, 2, 3, 493/23, 29; 364/479.01, 479.02, 479.05; 283/34, 35, 61, 62; 700/127, 128

(56) References Cited

U.S. PATENT DOCUMENTS 4,538,833 * 9/1985 Trikilis ..................................... 283/2
4,847,764 * 7/1989 Halvorson ....................... 364/479.01

(List continued on next page.)

*Primary Examiner*—Lee Young
*Assistant Examiner*—A. Dexter Tugbang
(74) *Attorney, Agent, or Firm*—Walter C. Farley

(57) ABSTRACT

The inventive method bases on a consequent realization of the following two conditions: firstly on the consequent separation of the "immaterial or virtual sphere" of information from the "material or real sphere" of the paper and secondly on the consequent standardization of the printed information to a form such that a further processing after printing is not necessary. The consequent separation between information (immaterial sphere) and paper (material sphere) leads to an irreversible combination of the two only in the location where and at the time when the printed information is delivered to the ordering end-customer (reader) in form of a commodity unit, i.e. when contents, location and time of such a commodity unit are defined by the ordering customer. The advantage is that information can be recorded and organized considerably faster and in particular can be copied and transported considerably more simply in the immaterial sphere than this is the case in material sphere. Virtual (immaterial) information units are stored and kept ready over the time of their topicality, these virtual information units are copied, compiled, organized, addressed and transported over data lines according to order of the customer and the information units compiled according to order of the customer are decentrally printed onto paper by means of a (digital) printing method such that a directly deliverable printed product is produced.

13 Claims, 6 Drawing Sheets

U.S. PATENT DOCUMENTS

| | | | | |
|---|---|---|---|---|
| 5,060,025 | * | 10/1991 | Kummel et al. | 355/319 |
| 5,146,403 | * | 9/1992 | Goodman | 364/479.01 |
| 5,383,130 | * | 1/1995 | Kalisiak | 364/471 |
| 5,434,601 | * | 7/1995 | Nobumori | 364/1.1 |
| 5,546,316 | * | 8/1996 | Buckley et al. | 364/479.05 |
| 5,546,577 | * | 8/1996 | Marlin et al. | 395/600 |
| 5,611,066 | * | 3/1997 | Keele et al. | 395/427 |
| 5,615,123 | * | 3/1997 | Davidson et al. | 364/479.03 |
| 5,625,758 | * | 4/1997 | Schneider et al. | 395/114 |
| 5,630,067 | * | 5/1997 | Kindell et al. | 395/200.09 |
| 5,666,191 | * | 9/1997 | Hasegawa et al. | 399/366 |
| 5,711,672 | * | 1/1998 | Redford et al. | 434/307 |
| 5,739,814 | * | 4/1998 | Ohara et al. | 345/173 |
| 5,740,028 | * | 4/1998 | Sugiyamam et al. | 364/130 |
| 5,751,590 | * | 5/1998 | Cannon et al. | 364/479.03 |
| 5,761,485 | * | 6/1998 | Munyan | 395/500 |
| 5,774,363 | * | 6/1998 | Sato et al. | 364/468.03 |

* cited by examiner

METHOD AND SYSTEM FOR PRODUCTION AND DECENTRALIZED DELIVERY OF PRINTED PRODUCTS

FIELD OF THE INVENTION

The invention concerns a method for production and decentralized delivery of printed products according to the generic part of the first claim and an arrangement for carrying out the method.

BACKGROUND OF THE INVENTION

Information printed on paper or on another equivalent printable carrier is read by the reader in form of newspapers, magazines, brochures, books etc. This kind of printed information is characterized by content and form, whereby the contents are to be understood as the actual printing and the form as the quality of paper, the format, the type of binding etc. The reader normally considers the content as primary characteristics and the form as secondary characteristics. Therefore it obviously does not concern the reader if both characteristics are firmly coupled to each other and only one or the other is free to choice. An example of an exception from this coupling of content and form are books which are available to the reader either as paperbacks or as hardbacks. However, in most cases with a given content the form cannot be selected by the reader at all but it is definitively predetermined by the topicality of the content and the length of time the content remains topical, by the size of the edition, by the price which a certain public is prepared to pay for the content and by the available manufacturing facilities with which the printed information is produced.

Further important characteristics of printed information are the place and time in which it becomes accessible to the reader. This is especially valid for printed information which is only of importance for a short time such as is represented, among many others, by newspapers and magazines. It lies in the interest of all producers of topical printed information to make information available to the reader wherever possible and as topical as possible. This is of an increasing importance to producers of printed information in particular to those who produce newspapers and magazines since information in printed form has to compete more and more against easily obtainable, directly offered and delivered not printed information such as radio, television and similar media.

According to the state of the art, the way of information via printed media requires a lot of time and must cover large distances (from one locality to another) and additionally requires a lot of work. Information to be printed is recorded (in writing) in a stage preliminary to the printing and organized (arranged and laid out on pages, sheets etc. in a predetermined order). These days the preliminary stage is normally carried out with electronic means. The organized information is then transferred to printing plates which are placed on printing machines. By means of printing machines the information is printed onto paper sheets or quasi endless paper webs and thus multiplied to mostly very high numbers. The printed paper is then further processed, i.e. folded trimmed, gathered, stitched, bound etc., the further processing possibly comprising an intermediate storage. The finished printed products produced in the further processing are, possibly after further intermediate storage, organized to form shipping units and are distributed by transport, two steps which are often carried out several times (manufacturer, distributor, retailer, customer). At the end of the process the printed information ends in the hand of a reader who has obtained the printed information via a corresponding "order".

In most cases the "order" of the reader for obtaining printed information is given to a retailer (bookseller, news agent) on the marketing front or to a publisher (subscription), whereby the retailer or the publisher respectively is in possession of the printed information desired by the reader due to having given corresponding orders to the distributor or printer respectively.

A direct order from the reader to the printer would avoid a lot of over-production which is caused by the premature nature of the orders of the non-end-customers but it would lead to intolerable delay or would lead to an immense increase in capacity for preventing such delays and therefore, to drastically higher prices for printed products. If in addition the reader would want to determine the content to a much higher degree he would have to direct his order to the preliminary stage, which is not imaginable with the current process and with the means of manufacture currently used for producing printed topical information. This kind of procedure is just not possible.

SUMMARY OF THE INVENTION

The object of the invention is to make this kind of procedure possible. In other words it is the object of the invention to show a method for production and decentralized delivery of printed products with which it becomes possible to offer to the user as well as to Supply to him in any desired locality a freer choice of more topical printed products. The inventive method is not to render the price of printed information higher due to higher material and energy costs and/or due to larger investments. A further object of the invention is to create an arrangement of devices, a system for carrying out the inventive method.

The inventive method substantially consists of offering the information and letting the customer (if ever possible the end customer) choose and order it and of compiling the information and transporting it according to the order of the customer and then only printing it in the locality where the customer is.

The inventive method becomes possible if two fundamental ideas are consequently realized. These two fundamental ideas are the following:

firstly a consequent separation of the "virtual or immaterial sphere" of the information from the "real or material sphere" of the paper (or generally of the material printable carrier) and secondly a consequent standardization of the printed information to a form which is designed such that further processing after printing is not required.

The consequent separation between information (immaterial sphere) and paper (material sphere) causes the two "spheres" not to be combined inseparably in the form of commodity units until the point in time when the printed information is delivered to the ordering end-user (reader), i.e. when the content, location and time of such a commodity unit are defined by the ordering customer. The advantage of the consequent realization of these ideas stems from the fact that in the immaterial sphere information is recorded and organized much faster and in particular is reproduced in a more simple and faster manner than this is the case in the material sphere. A further advantage is the fact that in the immaterial sphere in which no material is concerned, storage and disposal of overproduction creates a lot less problems than in the material sphere.

According to the current state of the art, the immaterial sphere of information and its processing and the material sphere which apart from the paper comprises the printing plates also, are inseparably interconnected in a very early production stage, i.e. when manufacturing the printing plates or with digital printing during the printing process, whereby units are formed which for a number of following production steps (further processing, transport, delivery) in which they become finished commodity units are material-bound unnecessarily early.

The consequent standardization to a form (in the sense defined above) which does not require any further processing and which can only be varied in dependence of the printed content within a narrow scope and thus cannot be influenced by the customer increases the value of the content as a primarily selectable characteristic of printed information and complements the separation between immaterial sphere and material sphere described above.

By the consequent standardization of the form of the produced products, the form variety as a criteria of choice for the end customer is reduced. However, as mentioned above, for printed information produced according to the state of the art form as a selectable characteristic is also devalued to the greatest extent. This fact though is not much noticeable within the great variety of offered forms (many standardizations) which are all not selectable independent of the printed contents.

The combination of the two fundamental ideas or conditions respectively resulting in the inventive method for production and delivery of printed information is significantly more purposefully organizeable and thus significantly less costly regarding time and installation compared to conventional such methods. It requires far less storage room and creates a far smaller material overproduction. Variants of the inventive method result from a more or less consequent realization of the two fundamental ideas.

Printed media produced and delivered according to the inventive method are rather comparable to media such as television and radio than to conventional printed media. The novel printed media is chosen from information recorded and organized in a virtual library and is printed in a decentralized manner regarding time as well as locality. The selection from the library can be carried out interactively also. This compares to television where information is compiled, processed and brought onto the screen, the consumer selecting channels and individual programmes consuming them immediately and/or recording them with a video recorder for later use. Radio works in the same manner: the information on offer is manifested by loudspeakers and the consumer can listen to it or conserve it in form of sound recording.

The advantage of the novel printed media technique compared to media such as television and radio is the greater temporal independence which is guaranteed by the virtual library. Video and tape recordings can reduce the strict temporal definition of the information broadcasted on television and radio but only concerning the consumption not for the order (recording) to be made. Thus, the novel (electronic) printed media is from the view point of the consumer comparable as technical equivalent to the more modern, faster and more flexible media and it has its own additional advantages (no absolute dependence in time) which is revolutionary compared to the current state of the field of printed media.

BRIEF DESCRIPTION OF THE DRAWINGS

The inventive method and an arrangement of devices for production and delivery of printed information are described in detail in connection with the following Figures, wherein.

DESCRIPTION OF THE PREFERRED EMBODIMENTS

Figure 1:
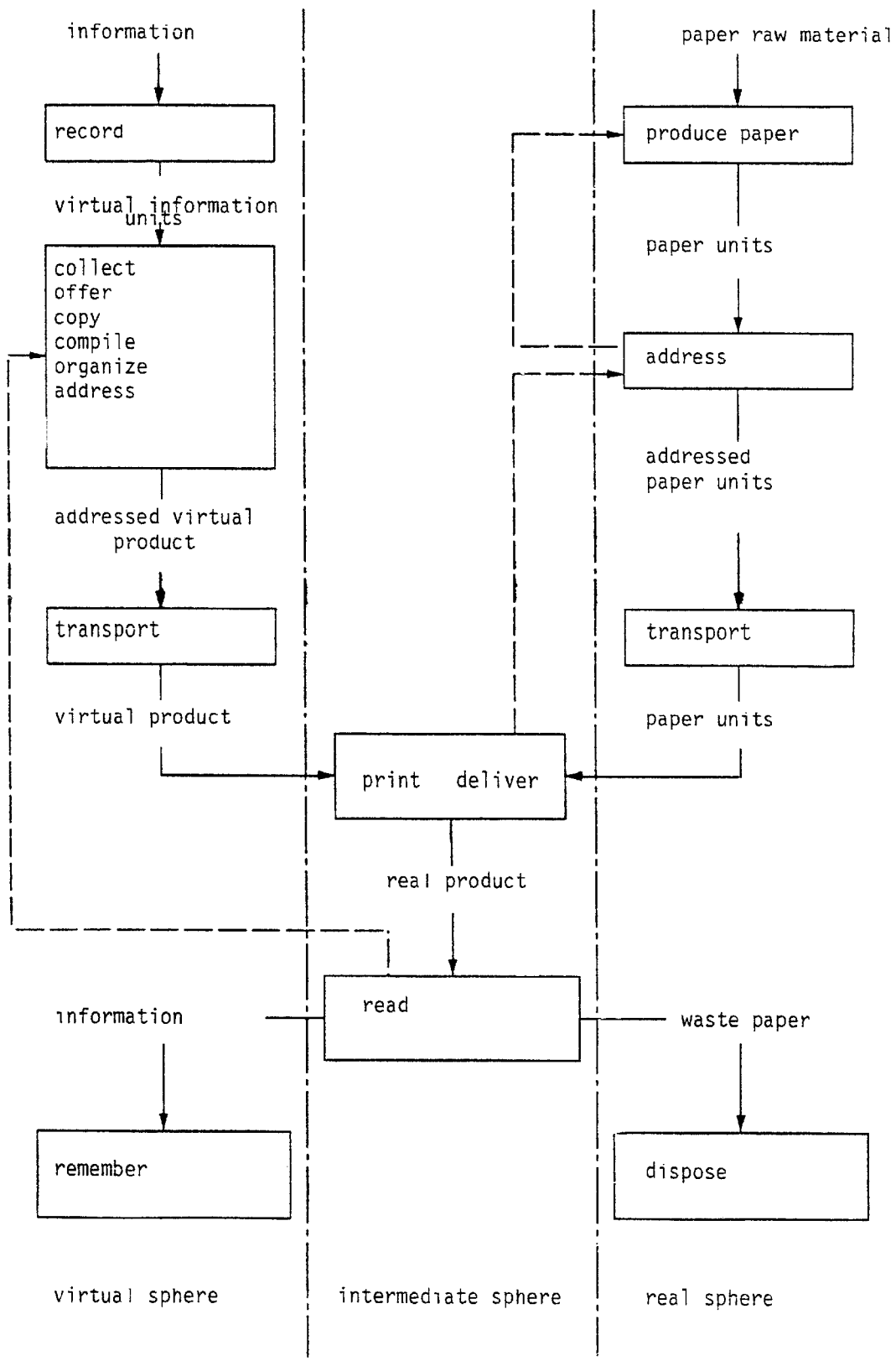
FIG. 1 shows a diagram concerning the course of the inventive method for production and delivery of printed information.

FIG. 1 shows a diagram of the inventive method which is carried out in three spheres, in a virtual or immaterial sphere shown on the left, a real or material sphere shown on the right and in an intermediate sphere in which immaterial sphere and material sphere are superimposed. In the immaterial sphere "pure information" is processed, i.e. information in form of electronically processable data having a connection to material carriers which is reversible to the highest degree. In the material sphere "pure material", especially unprinted paper or other printable carriers such as e.g. plastic sheeting or something similar are processed. In the intermediate sphere between the immaterial and the material sphere information and material are irreversibly combined with each other (printed paper or carriers respectively) and are processed in this form.

In the diagram of FIG. 1, the groups of activities carried out in the three spheres are shown as boxes, the "products" made by groups of activities and processed by subsequent groups of activities are indicated between the boxes, whereby the "products" are real products in form of not printed or printed paper or they are virtual units, mostly sets of data.

Courses of products between the boxes of the activity groups are shown as unbroken arrows in the diagram, courses of orders are shown with broken arrows.

Information is recorded to form virtual information units in a first activity group. Virtual information units are in particular digitally recorded and electronically stored texts and images as well as whole articles, advertisements, advertising units etc. consisting of text and image. Information units consisting of groups of articles and advertising components are also imaginable such as they are known as smaller publications or parts of publications (section of a newspaper).

However, the virtual information units can also be considerably smaller. They can be parts of mailing catalogues containing information about individual objects or groups of objects; they can even be individual entries e.g. of telephone directories.

In a second group of activities virtual information units are collected and kept on offer in one or several electronic libraries. When ordered by a customer, information units stored in the library are copied, compiled to a virtual printed product and the product is addressed according to the order. The product of this group of activities is a virtual, addressed printed product, i.e. a set of data which contains the data of the information units selected by the reader in an organized succession as well as the control data for their transport (address and printing device) and the control data for a printing device (initializing, paper feed, paging etc.).

In a third group of activities virtual addressed products are transported. The transport of the individual products is controlled by the control data specific to the address and works via data lines, e.g. via the telephone net.

The address of the virtual addressed product describes a printing device which is the transport destination. The printing device on the one hand processes virtual sets of data and on the other hand real paper; thus its activity (printing) is located in the intermediate sphere between immaterial and material sphere.

The printing device is controlled by the control data contained in the virtual, addressed product in order to print out the compiled and organized information units. The form of the product to be printed is consequently standardized, i.e. this also concerns the feeding of paper or of a different printable carrier into the printing device. The standardized form of the printed product (see FIG. 2) is such that as little further processing as possible is necessary after printing, i.e. that the product delivered by the printing device is immediately ready for use.

The real product delivered by the printer is received by the ordering customer (i.e. delivered to the same directly by the printing device respectively) and if this customer is the reader it is read directly, whereby the object of this activity also consists of real printed paper containing information and thus is located in the intermediate sphere. The activity of reading again leads to a separation into virtual information which the reader remembers (last activity in the immaterial sphere) and into waste paper (last activity in the material sphere).

The activities on the right side (in the material sphere) concern the printable carrier, e.g. paper. They comprise the manufacturing of the paper (first activity group) in which the paper units, e.g. rolled quasi endless webs of paper or packages of paper sheets, are manufactured. In a second activity group, e.g. by a paper distributor these paper units are addressed according to order. The addressing is carried out in virtue of orders stemming from the area of the printing device. The addressing distributor influences the production of paper by an according order.

The addressed paper units are transported according to the address (third activity group in the material sphere) and thus reach the printing device.

Storage is necessary in every method comprizing a plurality of method steps wherever orders are accepted and/or issued. If a certain freedom concerning selection and quantity is granted to the ordering party either the supplier or the ordering party must have a store. Thus, according to the inventive method, storage is necessary in the immaterial sphere in the area of the virtual information units (library with incoming orders) and in the material sphere in the area of the paper units (incoming orders). Furthermore, storage is necessary in the area of the printing device (outgoing orders). If the reader is the ordering customer (as shown in FIG. 1) further storage, in particular storage of printed paper is omitted completely. If the form of the printed information to be delivered is consequently standardized, storage in the real sphere (paper) can be restricted to a minimum (one single quality of paper).

Storage in the area of the information units causes no great problem not only because sets of data can be stored on little space and are still accessible without problems but also because the data sets are stored before reproduction, i.e. in a phase of the method in which each information unit is stored substantially in one copy only.

The main advantage of the inventive method is the fact that by largely decoupling the immaterial sphere from the material sphere the order of the final user can take effect on the method at a much earlier stage, because in the immaterial sphere organizing and transporting are carried out considerably more purposefully than in the material sphere. Thus the necessity of intermediate orders and thus a storage at different acceptance/issue locations of such intermediate orders is eliminated.

The individual activities of the inventive method must be subjected to restrictive conditions if achieving the above mentioned advantage is not to render the delivery according to the order unnecessarily expensive to the end user and is not to keep it tied to restricted intervals of time.

This especially concerns the printing, i.e. the activity of the printing device. As printing is obviously carried out after copying and after transporting the information to be printed, i.e. in a highly decentralized manner, a large number of printing devices must be provided, especially for a large delivery net. If the ordering customer is the reader this also means that every product to be printed is with a high probability different from the product printed before. This means that the size of the "editions" is lowered not only to very small numbers but actually to individual products. The two named conditions exclude the use of printing machines as they are used today for production of topical information (newspapers, magazines).

The printing machines to be used must be so-called digital printers. These are printing devices which do not use elements with a stationary form (printing plates) representing the pattern to be printed but elements which set up the printing pattern directly on the paper by a corresponding succession of adaptations. Different types of this kind of printing device are available on the market (laser printers, thermo-printers, ink jet printers etc.) and development for improving the printing quality and printing speed achievable with such printing devices is currently intensely worked on.

In order to be able to fulfill the condition named above and to realize the demanded decentralization of the printing activity new paths must also be found in the area of the further processing of the printed paper. In FIG. 1 the method step for this further processing is obviously missing. According to the methods of the state of the art no further processing of the printed paper is only possible for printed products which consist of one single printed sheet which is not folded.

Figure 2:
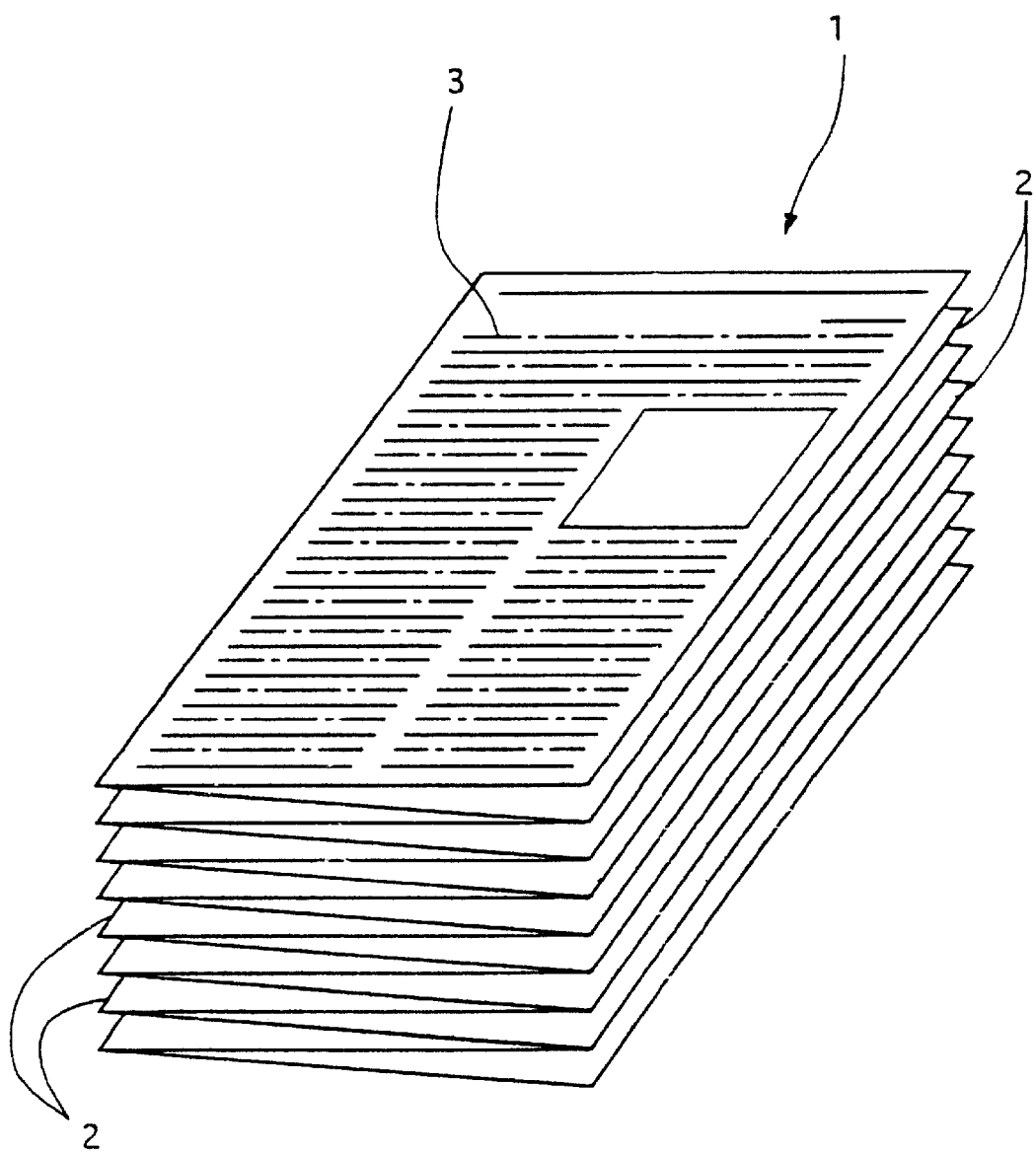
FIG. 2 shows the standardized form of the delivered printed information produced according to the inventive method.

For the inventive method the Leporello-form, as shown in FIG. 2 and printed on both sides is a particularly suitable form for the material product to be produced and delivered. A Leporello-shaped printed product 1 is a paper web which is subdivided into a plurality of connected sheets by folds 2 having alternating folding directions and being perpendicular to the length of the web such that the paper web can be folded into a folded stack.

One-sided printing of folded stacks is known from a time when digital printers were used only for printing one-off prints of information and when sheet-feeding was not yet available. Printing on so-called reel paper was the solution of a problem of the paper feed into the printer. The sheets of the reel paper used for this purpose are not only divided by folded edges but by perforated folded edges. Usually directly after printing, these connected sheets are separated from each other, reorganized and combined again like individual sheets with any connecting means (in an new order compared to the folded stack). The printing of reel paper then disappeared, probably due to this additional work, when devices for sheet feeding were developed.

According to the inventive method however, it is not a paper feeding problem which is solved by producing products in Leporello-form but on the one hand a form is created which is independent of the size of contents (number of pages) and on the other hand all further processing steps can be avoided. All the same, the product forms a physical unit and is comfortably readable.

In order for the Leporello-formed product to be readable at least as comfortably as conventional multi-page printed products (magazines, books, newspapers etc.) it is advantageously printed on both sides of the paper such that the printed lines are substantially perpendicular to the folded edges. The first or front page 3 is printed on the front side of the first sheet of the row of sheets contained in the Leporello. The following pages are printed on the back sides of all sheets from the first to the last sheet and on the front side from the last sheet to the one which is next to the first sheet carrying the front page. For a Leporello-shaped product consisting of a row of five sheets the numbering of the pages is the following (with the row of sheets folded open from left to right or last to first sheet in the row respectively): 7/6, 8/5, 9/4, 10/3, 1/2 (front side/back side). For a printed product with n pages and n/2 sheets (n is an even integral number) this generally means that on the one side of the series of sheets the succession of pages is (n/2+2), (n/2+3), ... n, 1 and on the other side the succession of pages is (n/2+1), n/2, (n/2−1), ... 3, 2.

If the sheets are out-putted by the printing device as a folded stack they are advantageously printed in the succession given above such that the first sheet carrying the front page comes to lie on the top of the stack.

Obviously, printed products in Leporello-form with folded edges substantially parallel to the printed lines which products are to be leafed through from top to bottom (or from bottom to top) instead of from left to right can also be produced according to the inventive method.

On the one hand, a Leporello-shaped newspaper or magazine is particularly suitable for the inventive method because independent on whether the Leporello-shaped product has many or few pages or even only one page no process adjustment is needed apart from the specific succession of pages being determined by the software (imposing software). Furthermore, if the Leporello-shaped product is produced from a folded quasi endless paper web the only processing necessary afterwards is the separation of the printed sheets from the not printed sheets of the paper web which process step can be carried out with the most simple means and can even be left to be carried out by the customer.

If the Leporello-shaped printed product is produced from a paper web which is not folded, coming e.g. from a roll, the paper must be folded correspondingly before or after printing which requires a simple additional folding device which can he integrated into the printing device.

On the other hand the Leporello-form has, compared to current forms of printed products, the advantage of being able to be opened not only completely between any pages but also in varying modes, up to fully stretching out the row of sheets whereby the specific sequence of pages is not lost. This also means that the printed information can continuously extend across two or more pages without part of it being lost in the fold. Thus, each individual pair of pages has the same privileged characteristics as the centerfold of a stitched product. In a magazine with a glued spine no pages or double pages are thus privileged.

Figure 3:
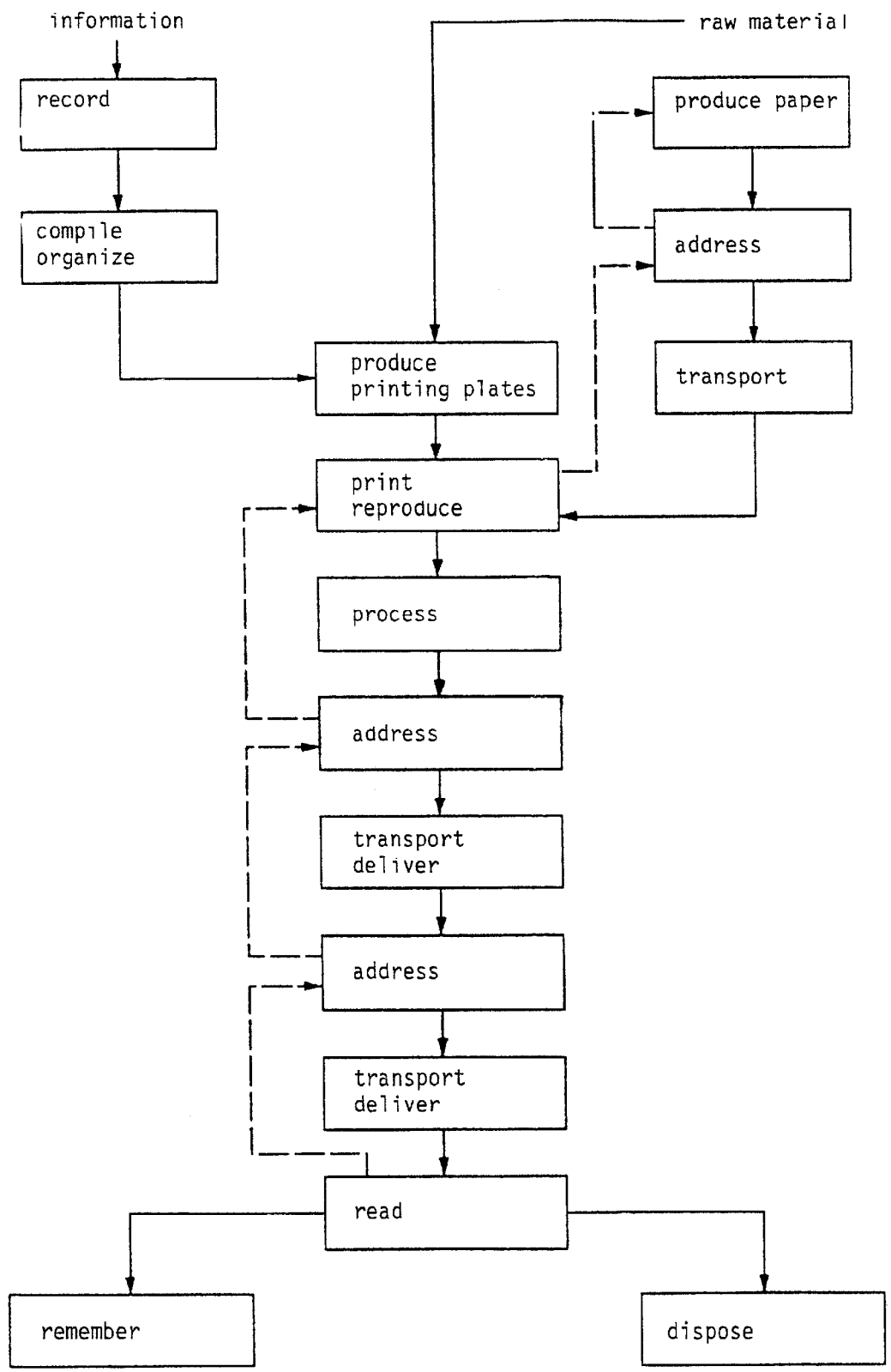
FIG. 3 shows a similar diagram to FIG. 1 but concerning the currently usual procedure for production and delivery of printed information.

In order to illustrate the difference between the inventive method and corresponding methods according to the state of the art FIG. 3 shows this kind of method in the same manner as in FIG. 1, i.e. separated into the immaterial sphere (left) and the material sphere (right) and an intermediate sphere in which material and immaterial sphere are superimposed. Again, activity groups are shown as boxes. The "products" to be mentioned between the activity groups are omitted due to lack of room.

The diagram of FIG. 3 does not actually require further explanation as it illustrates the state of the art. However, a brief explanation of the differences between the methods according to FIG. 1 and according to FIG. 3 seems useful, What catches the eye immediately is that the method steps in the intermediate sphere (superposition of immaterial and material spheres) are considerably more numerous. This means in particular that further processing, addressing and transporting is carried out in this sphere, whereby the two latter steps are often carried out twice or even more times. A further main difference is that according to the state of the art reproduction (copying) takes place in the intermediate sphere (when printing), according to the invention however in the immaterial sphere.

A direct effect of the consequent decoupling of immaterial and material sphere as realized in the inventive method, results in the considerably more simple structure regarding of orders which again becomes clear by comparing FIGS. 1 and 3. A similarly simple structure of orders combined with a free choice of content is not possible according to the known method (FIG. 3) within delivery times as demanded even if digital printing devices are used and transport is carried out via existing transport nets (post office).

Figure 4:
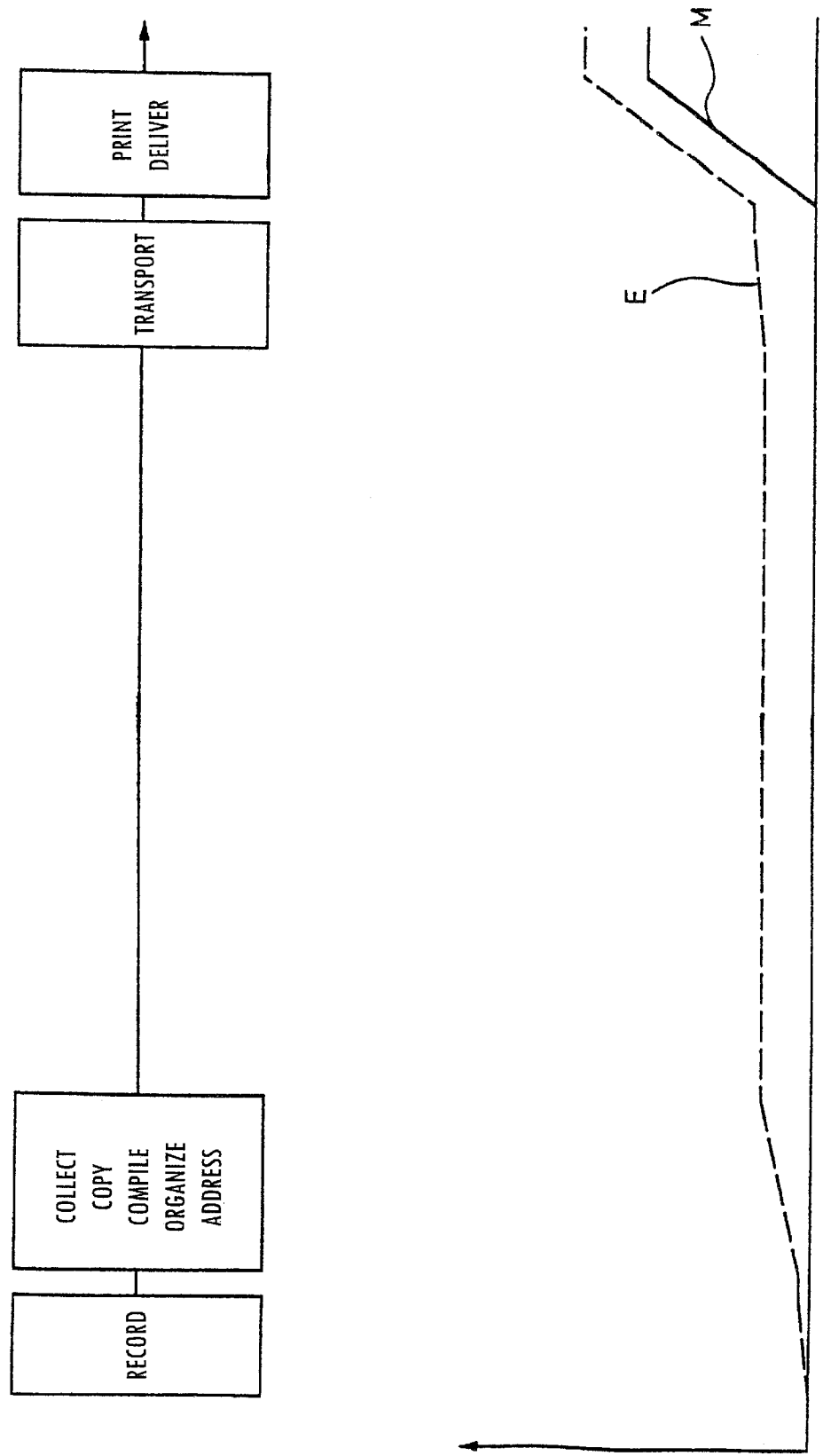
FIG. 4 shows a diagram concerning the material and energy cost of the inventive method.
Figure 5:
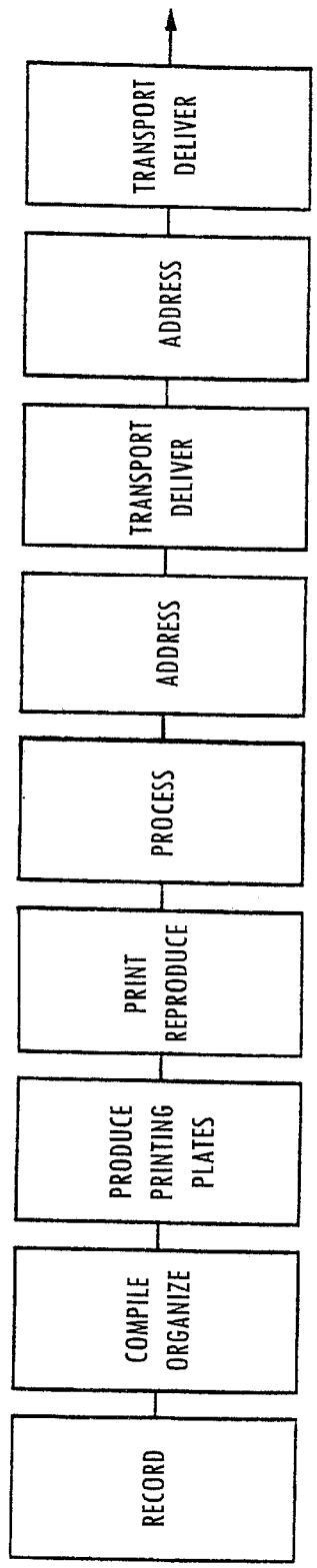
FIG. 5 shows a similar diagram to FIG. 3 but concerning the currently usual procedure.
Figure 5:
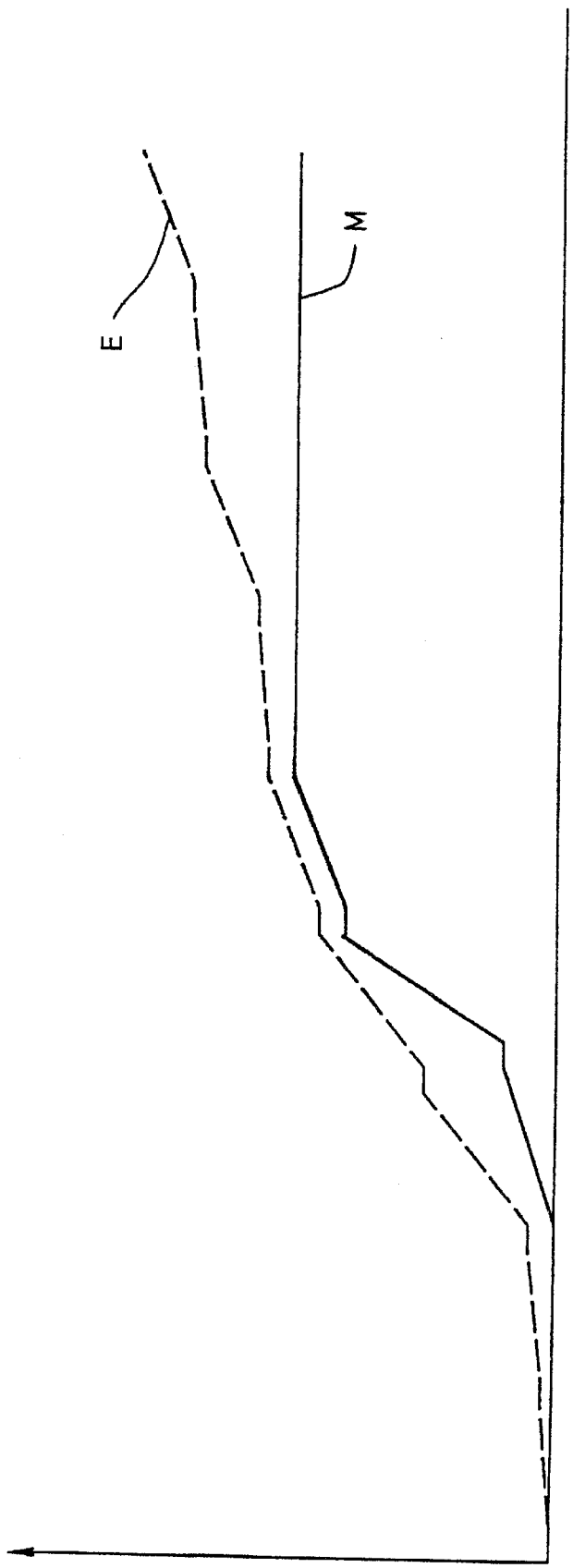

FIGS. 4 and 5 further illustrate the differences between the inventive method and corresponding current methods. The Figures show diagrams concerning the inventive method (FIG. 4) and known methods (FIG. 5) which diagrams show the required material M and energy E (ordinate) as a function of the method course (abscissa), whereby the course of the method is again shown with boxes for activity groups. In order not to make the diagrams unnecessarily complicated the production of paper which is the same for both kinds of method is not integrated in the diagrams.

A comparison of the two FIGS. 4 and 5 shows that according to the inventive method less material (no printing plates, no overproduction) is used and that less energy is necessary, especially because the paper is transported more purposefully (directly to the user).

Figure 6:
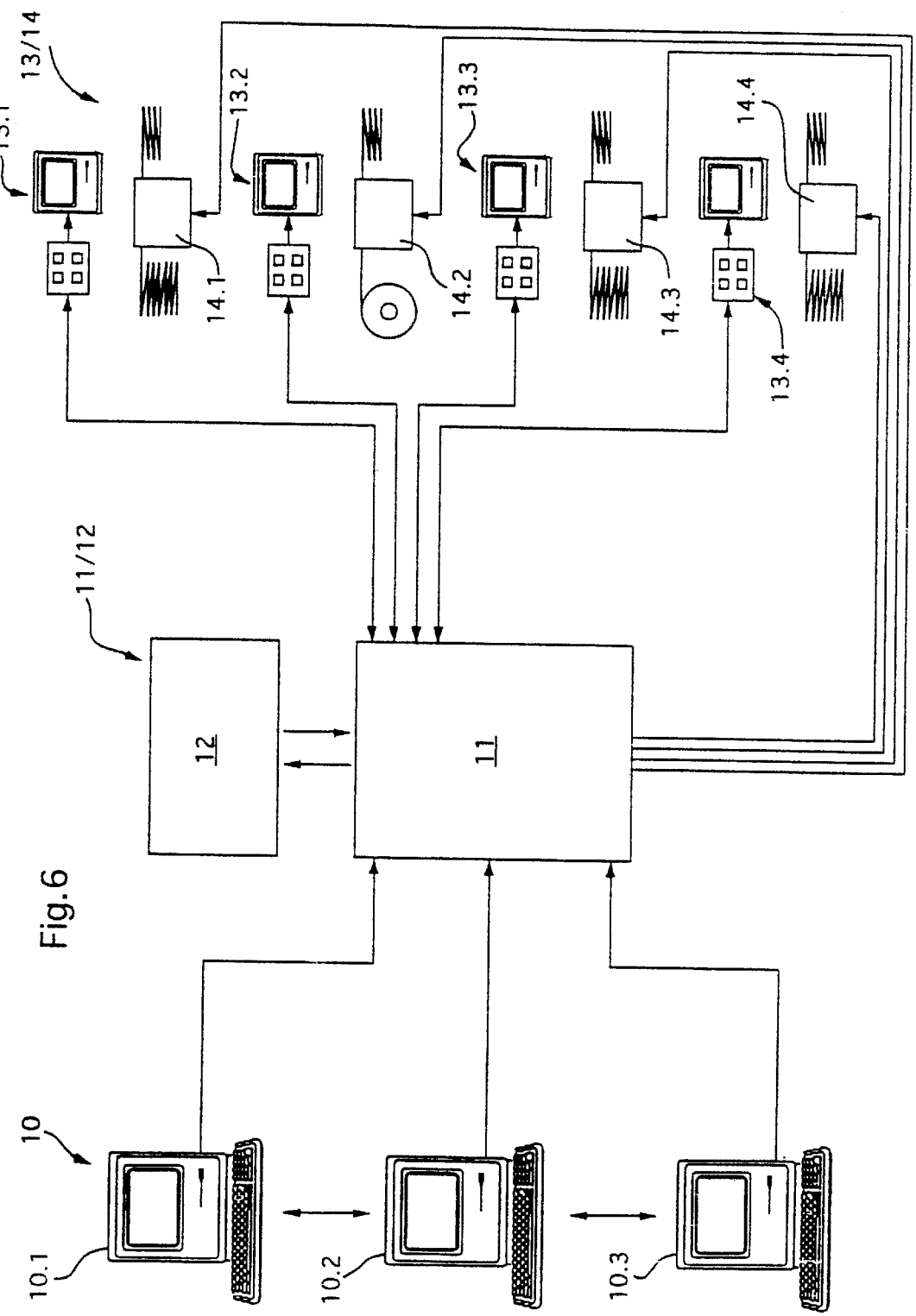
FIG. 6 shows an example of an arrangement of devices for production and delivery of printed information according to the inventive method.

FIG. 6 shows an exemplified arrangement of devices with which arrangement the inventive method is carried out. The arrangement consists substantially of three levels: an information recording level with workstations 10 for recording information, an ordering and delivering level with input stations 13 and printing devices 14 where information is ordered and correspondingly delivered and inbetween an order processing level with a system computer 11 and a memory 12 in which level the recorded information units are stored, processed according to order and their delivery is initialized.

The arrangement comprises at least one workstation 10 (three according to FIG. 6: 10.1, 10.2, 10.3) with the help of which information is recorded and processed into virtual (immaterial) information units. These workstations usually comprise screen and keyboard and/or a different input device (scanner etc.) and e.g. an own computer each or they are connected to a network with a server. The arrangement further comprises a system computer 11 to which system computer 11 a memory 12 is allocated. The workstations 10.1, 10.2, 10.3 are connected to the system computer via data lines, e.g. via modem and lines of the telephone net. The workstations can also be mutually connected via data lines.

The system computer 11 receives virtual information units from workstations 10.1, 10.2, 10.3 and stores them in memory 12 by which a virtual (immaterial) library is formed. The virtual library is managed by system computer 11 such that the information units are only accessible in the library during a certain time in which they are topical. Memory 12 thus is a library of topical, immaterial information units at every point in time.

The arrangement further comprises a plurality of decentrally arranged printing devices 14 (four in FIG. 6: 14.1, 14.2, 14.3, 14.4) which are connected to the system computer via data lines, e.g. with modem and telephone lines. The printing devices are equipped such that they print pre-folded paper from a paper stack (printing devices 14.1, 14.3, 14.4) or that they comprise an integrated folding device and print non-folded paper e.g. from a roll (printing device 14.2). In the area of each printing device 14 an input device 13.1, 13.2, 13.3, 13.4 is provided which is also connected with the system computer via a data line and with the help of which orders to the system computer are in-putted. The input devices 13 may be equipped for interactive ordering such that e.g. the current offer of the library can be inspected on a screen and the offered information units (e.g. newspaper articles or parts of newspapers) can be freely combined or there may be e.g. just keys for available information units (e.g. whole newspapers or magazines) with which a newspaper in a state of topicality corresponding to the very moment of the ordering can be ordered.

Obviously, arrangements in which several system computers with information libraries are provided are also thinkable whereby almost any linking of the computers is possible. The workstations 10 may be connected mutually and with different system computers 11 and the printing devices 14 and input devices 13 may be connected to any number of system computers 11. Furthermore, several system computers may be linked mutually. It is also imaginable that the input devices 13 are connected directly to the work-stations such that the end customer can e.g. input advertisements or wishes and criticism into the system.

The above description of the inventive method names mostly printed information with contents such as comprised in topical newspapers and magazines as examples. Obviously, the inventive method is not restricted to these applications. Apart from printed products with topical contents such as newspapers and magazines it is imaginable that e.g. local and/or classified telephone directories, mailing and advertising catalogues concerning specific types of object or services and further material can be produced.

Furthermore it is possible to integrate order administration into the inventive method e.g. such that a corresponding invoice is directly printed out together with the printed product, that the order is directly debited to an account accessible through a credit card inserted into the input device or that a "subscription card" is inserted which initializes an order automatically.

The individual devices (workstations 10, system computers 11, memory 12, printing devices 14, input devices 13 as well as wires or systems working without wires for transport of data sets) which are provided in the inventive method are per se known. What is new and inventive is their arrangement in a social environment and their mutual coupling by which they are connected to a system with which the given object is achieved.

What is claimed is:

1. A method for production and decentralized delivery of printed products containing units of topical information subject to repeated updating in a system including at least one workstation, a system computer, central read/write electronic memory means, a plurality of decentralized input stations having operating means and a plurality of printers each associated with one input station of said plurality of input stations, the method comprising the steps of with the at least one workstation, preparing information units and electronically transmitting the prepared information units to the system computer, using the system computer for storing information units in the central read/write electronic memory means and for replacing stored information units which are no longer of current interest, offering at the plurality of decentralized input stations the information units, at selected ones of the plurality of decentralized input stations, selecting information units with the operating means of the input stations from the offered information units, each selection containing a freely selected number of freely selected information units and each selection constituting one order, electronically transmitting orders from the selected ones of the input stations to the system computer, compiling with the system computer data sets, each data set corresponding to one order, by retrieving data from the central read/write electronic memory means corresponding to the information units according to the one order, editing the retrieved data to represent two sequences of printable pages for a self-contained printed product, and adding identifying data for transmission of the data set to the printer associated with the input station from which the order was transmitted and control data for the printer associated with that input station, electronically transmitting each data set from the system computer to the one of the printers associated with the one of the input stations from which the corresponding order was transmitted, initializing printers in response to transmitted data sets for printing the two sequences of pages according to data sets, one on each side of a paper web, and for laying out the printed product as a folded stack, forming a Leporello-shaped printed product as printed pages 1 through n with folded edges separating the pages from each other, and arranging the printed pages on one side of the printable carrier in the succession 1, n, n−1, . . . (n/2)+2 and arranging the printed pages on the other side of the printable carrier in the succession 2, 3, 4, . . . (n/2)+1, and separating from the paper web at each printer the printed parts of the paper web each of which constitutes one Leporello-shaped printed product according to one order.

2. A method according to claim 1 including transmitting orders and data sets between input stations, printers and the system computer using telephone lines.

3. A method according to claim 1 including folding the carrier web, before printing, to form a folded stack.

4. A method according to claim 1 including preparing the order in an interactive connection between any one input station and the system computer.

5. A method according to claim 4 wherein ordering initializes an order administration.

6. A method according to claim 5 and including providing an activating card to a user of an input station, and inserting the card into the input station to begin order administration.

7. A method according to claim 1 wherein an information unit corresponds to the content of one of an individual article, a section of newspaper or magazine, an entire newspaper or an entire magazine.

8. A method according to claim 1 wherein an information unit corresponds to the content of one of a part of a mail-order catalog, a prospectus, a price list or a telephone directory.

9. A system for production and decentralized delivery of printed products containing units of topical information subject to repeated updating comprising at least one workstation and a system computer with at least one central read/write memory for storing and updating the information in the form of information units in said at least one memory (12), said information units being stored and updated for as long as the units are of current interest;

a plurality of printing devices for printing information on both sides of a printable carrier delivered from a carrier web of indeterminate length and of forming a printed length of the web into a folded stack;

a plurality of decentralized input stations for offering information units, each said input station having operating means for permitting selection of information units and transmission of compiled identifications of selected information units to said system computer as an order, the selections of information units at any one input station being independent of selections of information units at other input stations, each said input station being associated with one of said printing devices; and means in said system computer for copying from the at least one central read/write memory data comprising selected information units for each order, processing the copied data to form a data set for each order and electronically transmitting each data set to a printing device associated with an input station from which a selection of information units was made, said data set including instructions for forming a Leporello-shaped printed product as printed pages 1 through n with folded edges separating the pages from each other, and arranging the printed pages on one side of the printable carrier in the succession 1, n, n−1, . . . (n/2)+2 and arranging the printed pages on the other side of the printable carrier in the succession 2, 3, 4, . . . (n/2)+1, said printing device being responsive to receipt of a transmitted data set to print the data from the transmitted data set as a fulfillment of an order from the input device, the data set being printed as the Leporello-shaped printed product and arranged as a folded stack.

10. A system according to claim 9 and including means comprising a telephone system for interconnecting said system computer and said printing and input devices.

11. A system according to claim 9 wherein said printing devices include means for processing a printable carrier rolled or pre-folded in a folded stack.

12. A system according to claim 9 wherein each said input device comprises means for interactively communicating with said system computer.

13. A system according to claim 12 wherein each said input device includes means for reading a card.

* * * * *